(12) United States Patent   (10) Patent No.: US 10,051,542 B1
Mansour et al.   (45) Date of Patent: Aug. 14, 2018

(54) DYNAMIC CONFIGURATION OF TRANSMISSION MODE RESPONSIVE TO A UE THAT IS ENGAGED IN A VOICE CALL HANDING OVER FROM LOWER FREQUENCY TO HIGHER FREQUENCY WHERE IT IS RAINING

(71) Applicant: Sprint Spectrum L.P., Overland Park, KS (US)

(72) Inventors: Nagi Mansour, Arlington, VA (US); Kevin Hart, Oakton, VA (US); Crisanto Ponce, Orlando, FL (US); Kafi Hassan, Fairfax, VA (US)

(73) Assignee: Sprint Spectrum L.P., Overland Park, KS (US)

( * ) Notice: Subject to any disclaimer, the term of this patent is extended or adjusted under 35 U.S.C. 154(b) by 0 days.

(21) Appl. No.: 15/787,357

(22) Filed: Oct. 18, 2017

(51) Int. Cl.
*H04W 36/00* (2009.01)
*H04W 36/30* (2009.01)
*H04W 36/20* (2009.01)
*H04W 36/18* (2009.01)
*H04W 24/10* (2009.01)

(52) U.S. Cl.
CPC .......... *H04W 36/30* (2013.01); *H04W 36/18* (2013.01); *H04W 36/20* (2013.01); *H04W 24/10* (2013.01); *H04W 36/0033* (2013.01)

(58) Field of Classification Search
CPC ...... H04W 36/30; H04W 36/18; H04W 36/20
See application file for complete search history.

(56) References Cited

U.S. PATENT DOCUMENTS

| 5,519,618 | A  | * | 5/1996 | Kastner | ................... | G01S 13/91 701/120 |
| 6,308,043 | B1 |   | 10/2001 | Solheim et al. | | |
| 2016/0165605 | A1 | * | 6/2016 | Dimou | ................ | H04B 7/0617 370/329 |
| 2016/0242098 | A1 | * | 8/2016 | Tsukamoto | ........... | H04W 28/18 |

* cited by examiner

*Primary Examiner* — Kathy Wang-Hurst
*Assistant Examiner* — Said M Elnoubi

(57) ABSTRACT

A computing system will detect when a UE engaged in a voice call hands over from a lower frequency coverage area to a higher frequency coverage area where it is raining, and the computing system will responsively take action to help improve the UE's communication quality, in an effort to help minimize the extent to which voice call quality will degrade as a result of the transition to the higher frequency where it is raining. In particular, per the disclosure, the computing system could respond to this scenario by causing the target base station to use a more robust wireless transmission mode than the source base station was using to serve the UE.

15 Claims, 3 Drawing Sheets

DYNAMIC CONFIGURATION OF TRANSMISSION MODE RESPONSIVE TO A UE THAT IS ENGAGED IN A VOICE CALL HANDING OVER FROM LOWER FREQUENCY TO HIGHER FREQUENCY WHERE IT IS RAINING

BACKGROUND

A typical wireless communication system includes a number of base stations each operating to provide coverage in which to serve user equipment devices (UEs) such as cell phones, tablet computers, tracking devices, embedded wireless modules, and other wirelessly equipped devices, whether or not user operated. In turn, each base station may sit as a node on a core access network that includes entities such as a network controller, switches and/or gateways, and the core network may provide connectivity with one or more external transport networks such as the public switched telephone network (PSTN) and the Internet. With this arrangement, a UE within coverage of the system may engage in air interface communication with a base station and may thereby communicate via the base station with various remote network entities or with other UEs served by the base station.

Such a system may operate in accordance with a particular air interface protocol, examples of which include, without limitation, Long Term Evolution (LTE) (using orthogonal frequency division multiple access (OFDMA) and single-carrier frequency division multiple access (SC-FDMA)), Code Division Multiple Access (CDMA) (e.g., 1×RTT and 1×EV-DO), Global System for Mobile Communications (GSM), IEEE 802.11 (WIFI), and BLUETOOTH. Each protocol may define its own procedures for registration of UEs, initiation of communications, handover between base station coverage areas, and other functions.

Further, each base station may provide wireless service to UEs on one or more carrier frequencies, with the air interface defining various downlink and uplink channels. For instance, on the downlink, the air interface may define a reference channel for carrying a reference signal that UEs can measure to evaluate base station coverage strength, the air interface may define various other downlink control channels for carrying control signaling to UEs, and the air interface may define one or more downlink traffic channels for carrying bearer data (e.g., application-layer communications) and other information to UEs. And on the uplink, the air interface may define an access channel for carrying UE access requests to the base station, the air interface may define one or more other uplink control channels for carrying control signaling to the base station, and the air interface may define one or more uplink traffic channels for carrying bearer data and other information to the base station.

When a UE initially enters into coverage of such a system, the UE may scan for a strongest base station coverage area in which to operate, and the UE may then engage in signaling with and via the base station, to register for service. The UE may then be served by the base station in a connected state in which the UE has an established radio-link-layer connection with the base station through which the UE and base station may exchange bearer data, facilitating communication by the UE on the external transport network for instance.

When so served, the UE may from time to time also monitor coverage strength from its serving base station and from adjacent base stations, to help ensure that the UE is served with sufficiently strong coverage and perhaps with the strongest available coverage. If the UE's coverage from its serving base station becomes threshold weak and/or if another base station's coverage becomes threshold strong (e.g., threshold stronger than the serving base station's coverage or than a defined level), then the UE may engage in signaling with its serving base station, and the serving base station may take action to coordinate handover of the UE to the other base station.

OVERVIEW

If a UE is engaged in a voice call at the time the UE hands over between coverage areas, the handover may result in variation in voice call quality. In particular, a user on either end of the voice call may perceive a change in quality of the voice audio as the UE transitions from operating in one coverage area (source coverage area) to operating in the other coverage area (target coverage area).

One reason for this change in voice call quality could be a variation in quality of wireless coverage provided by the source coverage area versus the quality of wireless coverage provided by the target coverage area. If the quality of coverage provided by the target coverage area is sufficiently lower than the quality of coverage provided by the source coverage area, then the voice call quality may degrade upon handover, because the target coverage quality may not properly support the voice codec being used for the call and/or because the degradation in wireless coverage quality may result in a transition to a lower rate voice codec or the like. Likewise, if the quality of coverage provided by the target coverage area is sufficiently higher than the quality of wireless coverage provided by the source coverage area, then the voice call quality may improve upon handover, as the improvement in wireless coverage quality may result in a transition to a higher rate voice codec or the like.

A specific scenario where this could occur is where the handover results in a significant increase in the carrier frequency on which the UE is being served. For instance, this could occur when a UE hands over from a source coverage area in which the UE is served on a first carrier frequency to a target coverage area in which the UE is served with a second carrier frequency that is significantly higher than the first carrier frequency. Generally, a higher frequency may result in higher path-loss and therefore weaker received communications. As a result, if a UE hands over from a lower frequency to a sufficiently higher frequency while engaged in a voice call, the voice call quality may correspondingly degrade.

In addition, this problem could be exacerbated if it is raining between the UE and the target base station. Rain (including similar such precipitation) in the air could attenuate wireless communications and could result in more attenuation at higher frequencies. Therefore, if it is raining between the UE and the target base station (e.g., at the UE's location, at the target base station's location, or in between the two) when the UE is engaged in a voice call and the UE hands over from the source station on a first frequency to the target base station on a significantly higher frequency, the voice quality could degrade even further as a result of rain-based attenuation at the higher frequency.

Unfortunately, this change in voice quality could be disconcerting to a user.

Further, it could be especially disconcerting to the user if multiple changes in voice quality occur during the course of a voice call, as may happen if the UE passes from a low-frequency coverage area to a high-frequency coverage area where it is raining and in turn again to a low-frequency coverage area.

As an example of this, consider a scenario where a wireless network implements macro base stations that provide coverage on relatively low frequencies (e.g., in the 600-900 MHz bands or in the 2.5 GHz band) and, to help fill in a coverage hole between two such macro base station coverage areas, the network also implements a small-cell base station that provides coverage on a significantly higher frequency (e.g., millimeter-wave in the 30 GHz to 300 GHz range). And assume that it is raining in at least the small-cell coverage area. In that scenario, if a UE is engaged in a voice call while the UE is served by one of the low-frequency macro coverage areas and is moving in a direction toward the other low-frequency macro coverage area, the UE may pass through and be served by the high-frequency small-cell coverage area along the way.

Due to rain in the high-frequency small-cell coverage area, wireless coverage quality could be quite attenuated there. As a result, quality of the UE's voice call may degrade when the UE transitions from being served by from the first macro coverage area to being served by the small-cell coverage area. And quality of the UE's voice call may then revert to a better level when the UE transitions from being served by the small-cell coverage area to being served by the second macro coverage area. As a result, a user may perceive a temporary reduction in voice call quality as the UE passes through the small-cell coverage area. Yet the user may not be aware of the fact that the user's UE has handed over between coverage areas. The user may simply see the situation as a temporary, disconcerting degradation in voice call quality.

Therefore, an improvement is desired.

Disclosed herein is a method and system to help alleviate this technological issue. In accordance with the disclosure, a computing system will detect when a UE engaged in a voice call hands over from a lower frequency coverage area to a higher frequency coverage area where it is raining, and the computing system will responsively take action to help improve the UE's communication quality, in an effort to help minimize the extent to which voice call quality will degrade as a result of the transition to the higher frequency where it is raining. In particular, per the disclosure, the computing system could respond to this scenario by causing the target base station to use a more robust wireless transmission mode than the source base station was using to serve the UE.

In practice, the computing system could be implemented at the target base station, such as by a controller of the target base station.

To facilitate this process, when the source base station hands the UE over to the target base station, the source base station could inform the target base station of the transmission mode that the source base station is/was using for serving the UE and of the frequency on which the source base station is/was serving the UE. Or the target base station can determine this information by querying one or more entities or in another manner. Further, by consideration of location data and querying a weather server or other such system, the target base station could determine that there is rain at or between the UE and the target base station. Responsive to this information, the target base station could then responsively select a transmission mode to use for wireless communication with the UE, with the selection of the transmission mode being based on the selected transmission mode being more robust than the transmission mode that the source base station was using to serve the UE. And the target base station could then apply the selected transmission mode in serving the UE as the UE's voice call continues.

Phrased another way, the target base station (or other entity carrying out this process) could determine that at least the following three factors are present: (i) the UE that is handing over is engaged in a voice call, (ii) the handover is from a lower frequency to a higher frequency, perhaps to a frequency that is at least a predefined threshold extent higher, and (iii) it is raining at or between the UE and the target base station. And in response to the determination that at least these three factors exist, the target base station could select and use a transmission based on the selected transmission mode being more robust than the transmission mode that the source base station was using in serving the UE. On the other hand, in an example implementation, if any of these factors is not present, then the target base station may not responsively engage in the process of selecting and using a transmission mode based on the selected transmission mode being more robust than the transmission mode that the source base station was applying; in that case, the target base station may apply a default transmission mode or may select a transmission mode without regard to the transmission mode that the source base station was using for service of the UE.

These as well as other aspects, advantages, and alternatives will become apparent to those of ordinary skill in the art by reading the following detailed description, with reference where appropriate to the accompanying drawings. Further, it should be understood that the descriptions provided in this overview and below are intended to illustrate the invention by way of example only and not by way of limitation.

DETAILED DESCRIPTION

This description will discuss implementation by way of example in the context of an LTE network. It will be understood, however, that principles of the disclosure can extend to apply in other scenarios as well, such as with respect to other radio access protocols. Further, even within the context of LTE, variations from the details disclosed may be possible. For instance, elements, arrangements, and operations may be added, removed, combined, distributed, or otherwise modified. In addition, it will be understood that operations described as being performed by one or more entities may be implemented in various ways, such as by one or more processing units executing program instructions for instance.

Figure 1:
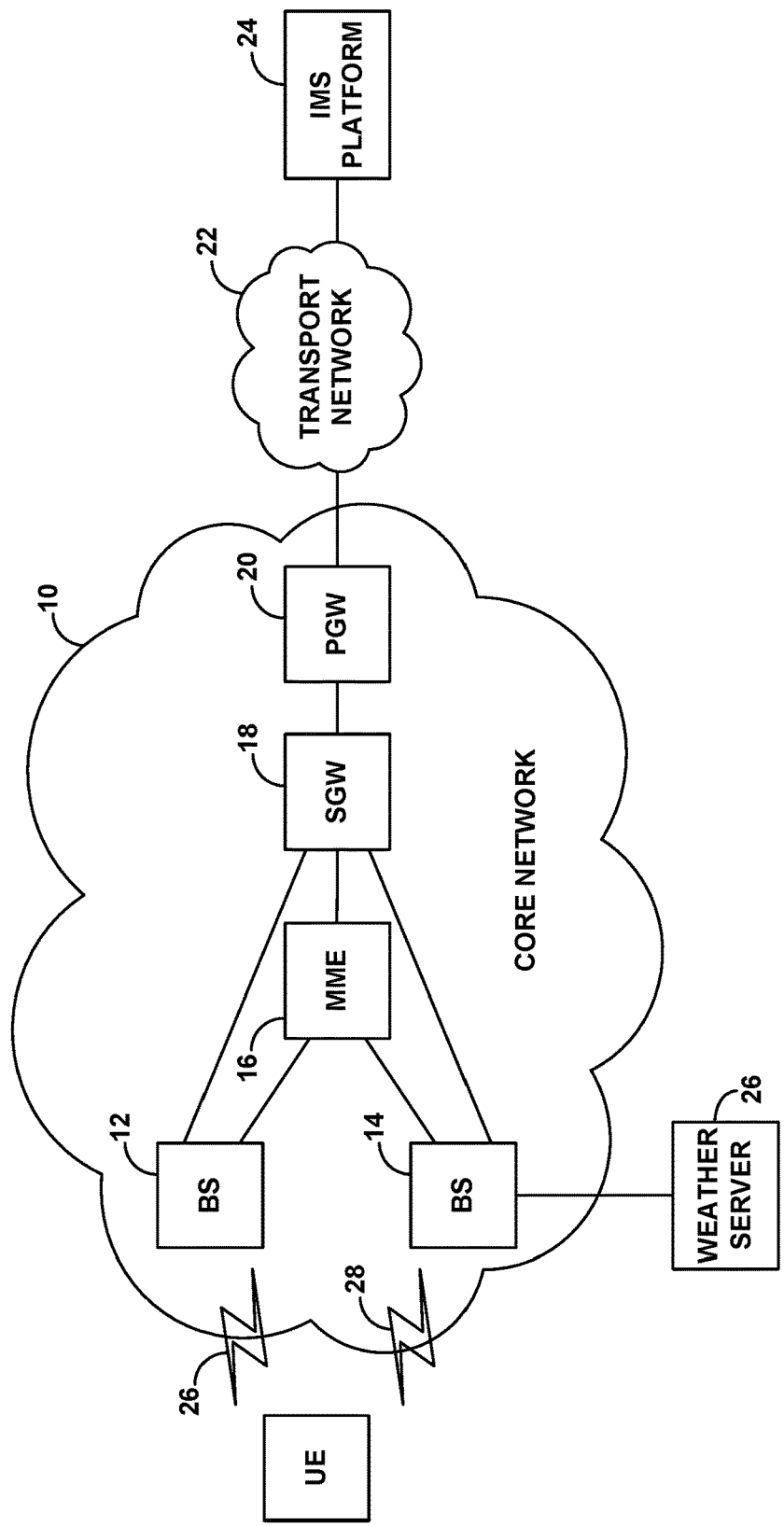
FIG. 1 is a simplified block diagram of an example wireless communication system in which features of the present disclosure can be implemented.

Referring to the drawings, as noted above, FIG. 1 is a simplified block diagram of a wireless communication system in which features of the present disclosure can be implemented. In particular, FIG. 1 depicts an example LTE network, which functions primarily to serve UEs with wireless packet data communication service, including voice-over-packet service, but may also provide other functions. The LTE network may be implemented by a wireless service provider. As shown, the LTE network includes a core network 10 (or "evolved packet core (EPC)"), which could be a packet-switched network compliant with the industry standard system architecture evolution (SAE) for the LTE protocol, and thus the entities shown on the core network could each have an IP address and be configured to communicate with each other over packet-based tunnels or other communication interfaces.

Shown sitting on the core network 10 are, by way of example, two LTE base stations 12, 14, referred to as evolved-Node-B's (eNodeBs), as well as a mobility management entity (MME) 16, a serving gateway (SGW) 18, and a packet data network (PDN) gateway (PGW) 20, with the PGW then providing connectivity with a packet-switched transport network 22 such as the Internet. With this arrangement, each eNodeB could have communication interfaces with the MME 16 and the SGW 20 and could be configured to communicate with the MME and the SGW over those interfaces, and the SGW could have communication interfaces with the PGW and could be configured to communicate with the PGW over those interfaces. Further, the eNodeBs could have communication interfaces (e.g., X2 interfaces) with each other and could be configured to communicate with each other over those interfaces.

In practice, each of the eNodeBs 12, 14 is configured to provide a respective coverage area 26, 28, such as a respective cell or sector, in which the eNodeB can serve UEs. As such, each eNodeB could take various forms. For instance, an eNodeB could be a macro eNodeB of the type typically including a tower-mounted antenna structure and providing a broad of coverage. Or an eNodeB could be a small-cell eNodeB or the like (e.g., a femtocell, relay, etc.) of the type typically having a smaller form factor and providing a narrower range of coverage. In any event, each eNodeB may include a radio (e.g., a baseband unit), a power amplifier, and an antenna structure, with these components cooperatively enabling transmission and reception over an air interface in a manner known in the art. In a representative implementation, the antenna structure comprises one or more antenna arrays, capable of supporting Multiple-Input Multiple-Output (MIMO) communications, beamforming, and/or other mechanisms for air interface transmission and/or reception.

Under LTE, each eNodeB's coverage area defines an air interface on a respective carrier, which could be frequency division duplex (FDD), in which separate ranges of frequency are provided for downlink and uplink communication, or time division duplex (TDD), in which a single range of frequency is multiplexed over time between downlink and uplink communication. Such a carrier would have a frequency bandwidth (e.g., 1.4 MHz, 3 MHz, 5 MHz, 10 MHz, 15 MHz, 20 MHz, or greater) defining a width of spectrum on which the eNodeB can provide service. In a representative implementation, eNodeB 12 provides coverage on a relatively low-frequency carrier, such as a carrier in the 600 MHz to 2.5 GHz range, whereas eNodeB 14 provides coverage on a relatively high-frequency carrier, such as a millimeter-wave carrier in the 30 GHz to 300 GHz range.

FIG. 1 also depicts as a node accessible via transport network 22 (or otherwise accessible) an Internet Multimedia Subsystem (IMS) platform 24. The IMS platform operates to provide IP multimedia services such as to support voice over IP (VoIP) call service. When a UE is served by the LTE network for instance, the UE could engage in VoIP call setup signaling (e.g., Session Initiation Protocol signaling) with the IMS platform to set up a VoIP call, which could include negotiating to use a particular voice codec based on consideration of the UE's current wireless coverage quality and/or other factors. And the IMS platform could operate as a bridge between a call leg with the UE via the LTE network and a call leg with another call party.

In a representative implementation, a UE may initially enter into coverage of eNodeB 12 and may engage in a process to connect with eNodeB 12 and to attach with the LTE network. Namely, the UE may engage in signaling to form a radio-link-layer connection with the eNodeB, and the UE may then transmit an attach request, which may pass via the eNodeB to the MME. After authenticating the UE, the MME may then coordinate setup of one or more bearers for the UE, each extending between the UE and the PGW and each supporting a respective quality of service level (having a respective quality of service class indicator (QCI)). One such bearer could be a default bearer (e.g., QCI 8 or 9) for carrying general Internet communications, and another such bearer could be an IMS signaling bearer (e.g., QCI 5) for carrying SIP signaling and the like between the UE and the IMS platform.

At some point, the UE may then initiate a voice call or the IMS platform may seek to connect a voice call to the UE. The UE and IMS platform may thus engage in SIP signaling to set up the voice call, with a voice coding rate based on the UE's air interface conditions or the like. And the IMS platform may correspondingly engage in signaling with the LTE network (e.g., with a policy server, not shown), to cause the LTE network to set up for the UE a VoIP bearer (e.g., QCI 1) for carrying conversational voice traffic between the UE and the PGW, so that the UE and IMS platform can then exchange that voice traffic as the voice call progresses.

As the UE is thus served by eNodeB 12 and is engaged in this voice call via the UE's established VoIP bearer, at some point the UE may hand over from being served by eNodeB 12 to being served instead by eNodeB 14. This may occur as a result of the UE's coverage from eNodeB 14 degrading and the UE detecting threshold strong enough coverage from eNodeB 14, and/or for one or more other reasons. To carry out this handover, eNodeB 12 may engage in handover-preparation signaling with eNodeB 14, including transmitting to eNodeB 14 a handover request message that causes eNodeB 14 to reserve resources and otherwise prepare for serving the UE, receiving from eNodeB 14 a handover response indicating that eNodeB 14 is ready to receive the handover, and transmitting to the UE a directive for the UE to switch over to be served by eNodeB 14. Further, as part of the handover process, eNodeB 14 may engage in signaling to transfer the UE's existing bearers from being via eNodeB 12 to being via eNodeB 14, and one such bearer would be the UE's existing VoIP bearer for the UE's ongoing VoIP call.

In practice, an eNodeB could use any various transmission modes for transmitting communications on the downlink to a served UE. The transmission mode that the eNodeB uses in a given instance defines one or more aspects of how the eNodeB physically transmits data to a UE, and perhaps how the UE receives and processes the eNodeB's transmissions. When the eNodeB has data to transmit to a UE, the eNodeB generally transmits to the UE a scheduling directive control message and may specify in that control message which downlink air interface resources will carry the data and what transmission mode the eNodeB will use for the data transmission. The eNodeB may then transmit the data accordingly using the indicated transmission mode, and the UE may accordingly receive the transmission.

Transmission modes can range from what could be deemed "most robust" to "least robust"—where the robustness of the transmission mode may define how well the wireless transmission could work in practice to facilitate conveyance of data from the eNodeB to the UE. In given wireless conditions (e.g., given strength of coverage from the eNodeB), a more robust transmission mode may allow for more successful wireless transmission from the eNodeB to the UE, with less error, than a less robust transmission mode.

The various available transmission modes may differ from each other in various ways. By way of example, they may differ in terms of how many antennas (or antenna elements) the eNodeB uses for transmission to the UE and perhaps how many antennas (or antenna elements) the UE uses for receipt of the eNodeB's transmission. Further, they may differ in terms of whether they provide spatial multiplexing and/or diversity, what type and extent of precoding they use, whether they use single user or multi user multiple-input-multiple-output (MIMO), whether they use beamforming, and/or one or more other factors.

In a representative implementation of LTE, transmission mode TM1 may use a single transmit antenna. Transmission mode TM2 may use transmit diversity (with the same information being transmitted by multiple different antennas) and might be deemed, by way of example, a most robust transmission mode when used for transmission to a UE experiencing low signal-to-noise-plus-interference (SINR). Transmission modes TM3 and TM4 may each use spatial multiplexing and could use transmit diversity or MIMO; when used with transmit diversity, TM3 and TM4 may each also be deemed a most robust transmission mode, whereas, when used with MIMO, TM3 and TM4 may be deemed to be somewhat less robust. Further, other transmission modes that involve beamforming might be used together with TM2 and/or TM3. An eNodeB might select a transmission mode based on the UE's air interface conditions, such as the UE's reported SINR or the like.

Per the present disclosure, as noted above, when the UE hands over from eNodeB 12 to eNodeB 14, eNodeB 12 may inform eNodeB 14 of the carrier frequency on which eNodeB 12 is serving the UE and the transmission mode that eNodeB is currently set to use for transmission to the UE. Further, eNodeB 14 could determine that the UE is currently engaged in a VoIP call, such as through signaling from eNodeB 12, including perhaps context information noting that the UE has a VoIP bearer, or through other means.

Given that the UE is engaged in a VoIP call, eNodeB could then determine whether the handover involves a significant increase in the carrier frequency on which the UE is being served. In this example scenario, as noted above, eNodeB 12 was serving the UE on a carrier frequency around 600 MHz to 2.5 GHz, and eNodeB 14 would serve the UE on a carrier frequency around 30 to 300 GHz. In this situation, eNodeB 14 could determine that the UE is experiencing a significant increase in its serving carrier frequency, as the frequency is increasing by a substantial order of magnitude, here from traditional LTE frequency to a millimeter-wave frequency. In practice, at issue could be whether the increase is some pre-configured threshold great increase, such as to a frequency that is a certain multiple higher or at least a certain increment higher. For instance, at issue could be whether the frequency increases at lease five-fold, at least ten-fold, or by some other extent. Without limitation, these are examples of significant or substantial increases in frequency. Other examples are possible as well.

Given that the UE is engaged in a VoIP call and that the UE is experiencing a significant increase in its serving carrier frequency, eNodeB 14 could further consider whether it is raining at or between the UE and eNodeB 14, namely whether it is raining at the location of the UE, at the location of eNodeB 14, and/or between the UE and eNodeB 14. To facilitate this, the eNodeB could determine its own location and the UE's location and could query a weather server (such as a server provided by the National Weather Service or other organization) to find out whether it is currently raining at or between the UE and the eNodeB.

The eNodeB could be provisioned with an indication of its own location as latitude and longitude coordinates. And the eNodeB could determine the UE's location through signaling with the UE and/or use of a mobile location platform, in any of a variety of ways now known or later developed, also as latitude and longitude coordinates. And as further shown in FIG. 1, the eNodeB could have a communication interface with a weather server 26. Through agreed messaging protocol, the eNodeB could then query the weather server to find out whether it is currently raining at the UE's location, at the eNodeB's location, or between the UE and the eNodeB.

Per the present disclosure, if the determination is that it is currently raining at or between the UE and eNodeB 14, in this situation where the UE is engaged in a VoIP call and is handing over to a significantly higher serving frequency, eNodeB 14 will select and use a transmission mode based on the selected transmission mode being more robust than the transmission mode eNodeB 12 was using in serving the UE. For instance, eNodeB 14 might have learned through the handover signaling that eNodeB 12 was using TM3 with MIMO for transmission to the UE. Given that the UE is engaged in a VoIP call and is transitioning to a significantly higher frequency where it is raining, eNodeB may responsively select TM3 with transmit diversity on grounds that TM3 with transmit diversity is more robust than TM3 with MIMO as was being used by eNodeB 12. In this manner, eNodeB 14 might be able to help boost the quality of its wireless transmission to the UE and might therefore be able to minimize or at least reduce the extent to which the UE's voice call quality would degrade as a result of the handover to a significantly higher frequency where it is raining.

On the other hand, as discussed above, the any of these factors is not present (e.g., if the is not engaged in VoIP call, if UE is not experiencing a significant increase in frequency and/or if it is not raining at or between the UE and eNodeB 14), then eNodeB 14 may instead apply whatever transmission mode it would in the normal course. Here, eNodeB 14 would not select transmission mode based on consideration of what transmission mode the source eNodeB 12 was using. Thus, if these factors are present, the target eNodeB would select transmission mode based on what transmission mode the source eNodeB was using, and if any of the factors is not present, the target eNodeB would select transmission mode without regard to what transmission mode the source eNodeB was using.

Figure 2:
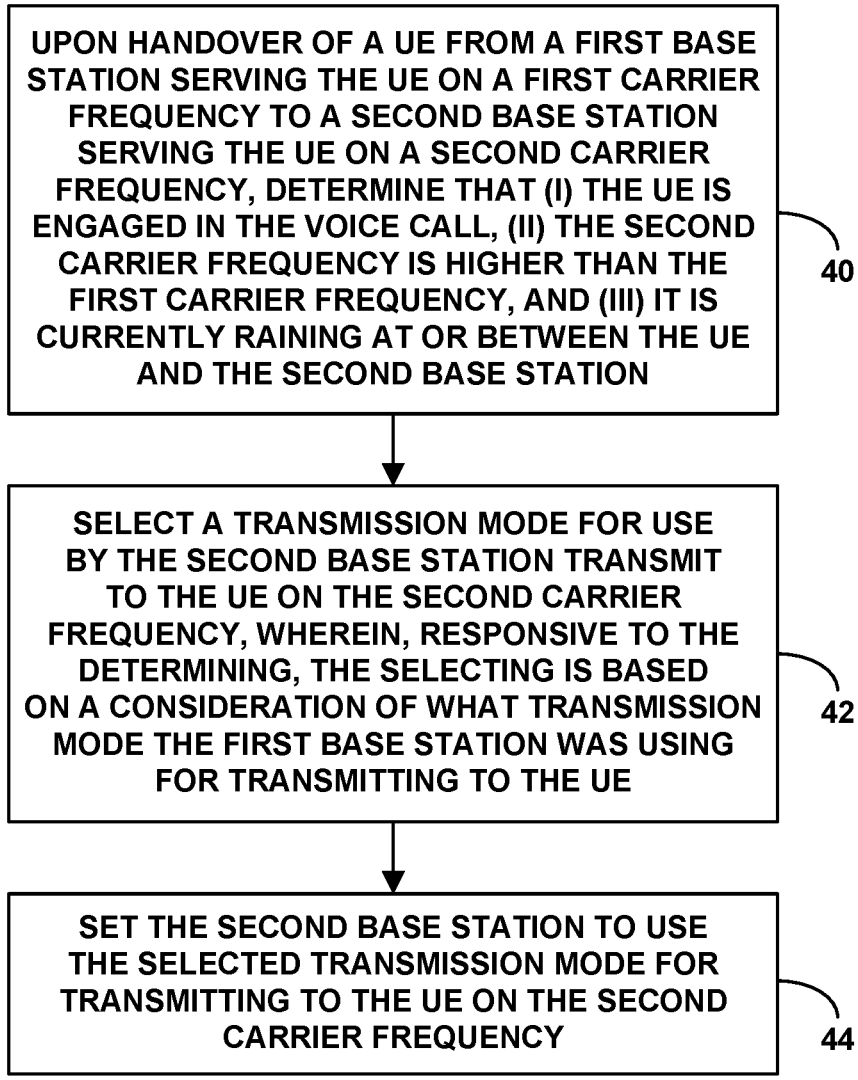
FIG. 2 is a flow chart depicting an example method per the disclosure.

FIG. 2 is a flow chart depicting operations that can be carried out in accordance with the present disclosure, to configure transmission mode for transmission to a UE engaged in a voice call. As shown in FIG. 2, at block 40, upon handover of a UE from a first base station serving the UE on a first carrier frequency to a second base station serving the UE on a second carrier frequency, the method includes determining that (i) the UE is engaged in the voice call, (ii) the second carrier frequency is higher than the first carrier frequency, and (iii) it is currently raining at or between the UE and the second base station. At block 42, the method further includes selecting a transmission mode for use by the second base station transmit to the UE on the second carrier frequency, wherein, responsive to the determining, the selecting is based on a consideration of what transmission mode the first base station was using for transmitting to the UE. And at block 44, the method includes setting the second base station to use the selected transmission mode for transmitting to the UE on the second carrier frequency (e.g., updating a context record for the UE to indicate this transmission mode, so that when the second base station schedules transmissions to the UE, the second base station will use this transmission mode). The method of FIG. 2 could be carried out by the second base station.

In an example implementation, the act of determining that the second carrier frequency is higher than the first carrier frequency comprises receiving by the second base station from the first base station, in handover signaling for the handover of the UE, an indication of the first carrier frequency on which the first base station serves the UE, and comparing by the second base station the indicated first carrier frequency with the second carrier frequency on which the second base station serves the UE. Further, the first carrier frequency could be about 600 MHz to 2.5 GHz, and the second carrier frequency could be about 30 GHz to 300 GHz, where "about" could mean give or take 10 percent or so).

Further, the act of determining that it is currently raining at or between the UE and the second base station could comprise querying by the second base station a weather server to determine whether it is raining at or between the UE and the second base station. And the method could further comprise determining by the second base station a location of the UE, wherein the querying is keyed to the determined location of the UE and a location of the second base station.

Still further, the act of selecting the transmission mode based on the consideration of what transmission mode the first base station was using for transmitting to the UE could comprise receiving by the second base station from the first base station, in handover signaling for the handover of the UE, an indication of the transmission mode that the first base station was using for transmission to the UE, determining a transmission mode that is more robust that the indicated transmission mode, and selecting the determined transmission mode. For instance, the indicated transmission mode that the first base station was using for transmission to the UE may be a transmission mode that does not use transmit diversity (e.g., TM3 or TM4 using MIMO rather than transmit diversity), and the selected transmission mode that is more robust than the indicated transmission mode uses transmit diversity (e.g., TM2, or TM3 or TM4 using transmit diversity rather than MIMO, possibly together with beamforming as appropriate).

Figure 3:
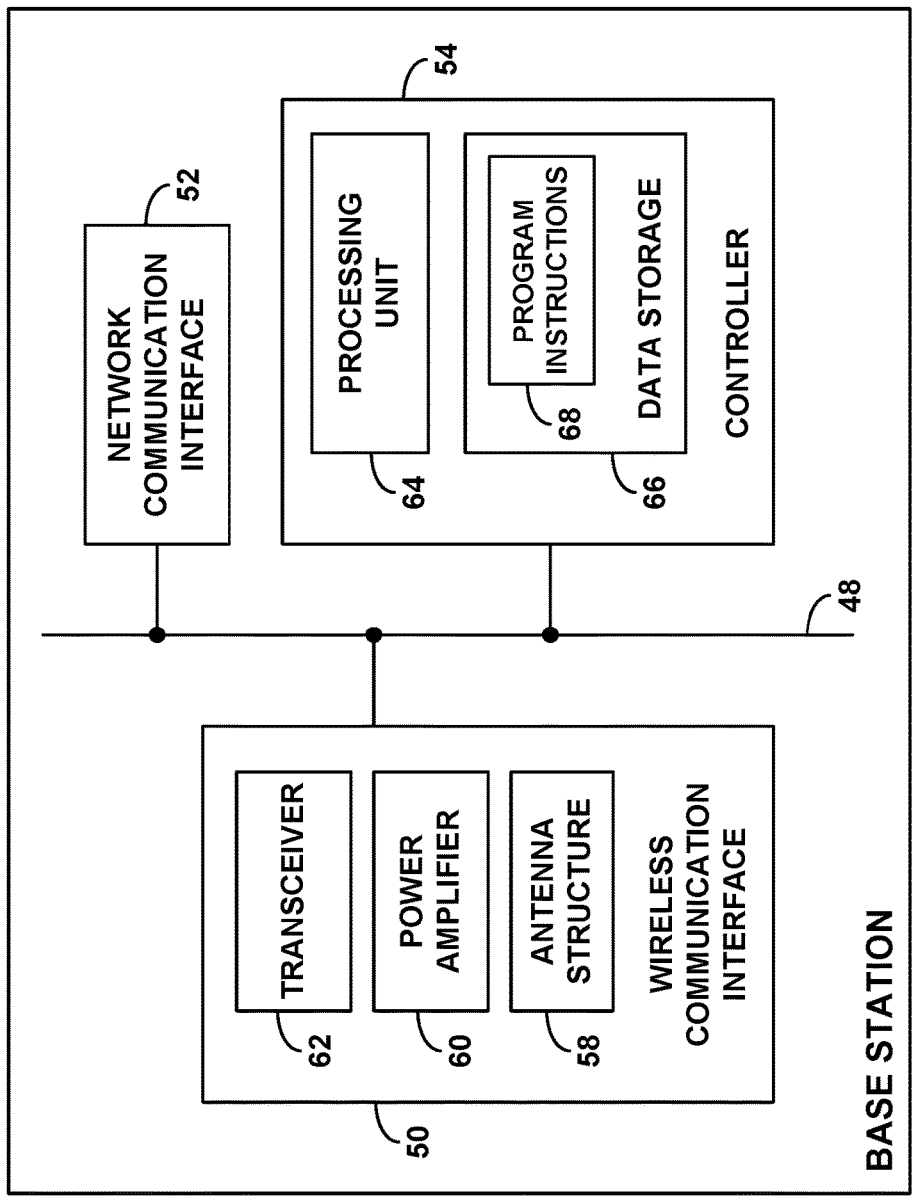
FIG. 3 is a simplified block diagram of an example base station operable to implement the method.

Finally, FIG. 3 is a simplified block diagram of an example base station, showing some of the components that the second base station could include in an example implementation. As shown in FIG. 3, the base station includes a wireless communication interface 50, a network (e.g., backhaul) communication interface 52, and a controller 54. These components are shown communicatively linked together by a system bus or other communication link 56, but it will be understood that the components could alternatively be integrated together or distributed in various ways. For instance, aspects of the controller 45 could be provided in a chipset that implements functions of the wireless communication interface 40. Other examples are possible as well.

As shown, wireless communication interface 50 could include an antenna structure (e.g., one or more antennas) 58, which, together with a power amplifier 60 and a transceiver 62, facilitates air interface communication (transmitting and receiving) over an air interface and thus communicating with and serving UEs over the air interface, on a designated carrier frequency. Network communication interface 52 could then include a wired or wireless network interface, such as an Ethernet interface, through which the base station could communicate with other entities such as with a source base station to facilitate handover processing and to receive information such as that discussed above.

Controller 54 could include a processing unit (one or more processors) 64, non-transitory data storage 66, and program instructions 68 stored in the non-transitory data storage and executable by the processing unit to carry out various operations described herein.

For instance, the operations could include determining, upon handover of the UE from the first base station to the second base station, (i) that the UE is engaged in a voice call, (ii) that a carrier frequency on which the second base station will serve the UE is significantly higher than a carrier frequency on which the first base station was serving the UE, and (iii) that it is currently raining at or between the UE and the second base station. And the operations could include selecting a transmission mode to use for transmission by the second base station to the UE, and wherein the operations include, responsive to the determining, selecting the transmission mode based on consideration of transmission mode that the first base station was using for transmission to the UE.

Exemplary embodiments have been described above. Those skilled in the art will understand, however, that changes and modifications may be made to these embodiments without departing from the true scope and spirit of the invention.

We claim:

1. A method for configuring transmission mode for transmission to a user equipment device (UE) engaged in a voice call, the method comprising:

upon handover of a UE from a first base station serving the UE on a first carrier frequency to a second base station serving the UE on a second carrier frequency, determining that (i) the UE is engaged in the voice call, (ii) the second carrier frequency is higher than the first carrier frequency, and (iii) it is currently raining at or between the UE and the second base station;

selecting a transmission mode for use by the second base station to transmit to the UE on the second carrier frequency, wherein, responsive to the determining, the selecting is based on a consideration of what transmission mode the first base station was using for transmitting to the UE; and setting the second base station to use the selected transmission mode for transmitting to the UE on the second carrier frequency, wherein the transmission mode that the first base station was using for transmitting to the UE does not use transmit diversity, and wherein selecting, based on consideration of what transmission mode the first base station was using for transmitting to the UE, the transmission mode for use by the second base station to transmit to the UE on the second carrier frequency comprises: based on the transmission mode that the first base station was using for transmitting to the UE not using transmit diversity, selecting as the transmission mode for use by the second base station to transmit to the UE on the second carrier frequency a transmission mode that uses transmit diversity.

2. The method of claim 1, carried out by the second base station.

3. The method of claim 2, wherein determining that the second carrier frequency is higher than the first carrier frequency comprises receiving by the second base station from the first base station, in handover signaling for the handover of the UE, an indication of the first carrier frequency on which the first base station serves the UE, and comparing by the second base station the indicated first carrier frequency with the second carrier frequency on which the second base station serves the UE.

4. The method of claim 2, wherein the first carrier frequency is within a range of about 600 MHz to 2.5 GHz, and wherein the second carrier frequency is within a range of about 30 GHz to 300 GHz.

5. The method of claim 2, wherein determining that it is currently raining at or between the UE and the second base station comprises querying by the second base station a weather server to determine whether it is raining at or between the UE and the second base station.

6. The method of claim 5, further comprising determining by the second base station a location of the UE, wherein the querying is keyed to the determined location of the UE and a location of the second base station.

7. The method of claim 2, wherein selecting the transmission mode based on the consideration of what transmission mode the first base station was using for transmitting to the UE comprises (i) receiving by the second base station from the first base station, in handover signaling for the handover of the UE, an indication of the transmission mode that the first base station was using for transmission to the UE, (ii) determining a transmission mode based on consideration of the indicated transmission mode, and (iii) selecting the determined transmission mode.

8. A computing system configured to control transmission mode for transmission to a user equipment device (UE) engaged in a voice call, wherein the computing system comprises a processing unit, data storage, and program instructions stored in the data storage and executable by the processing unit to carry out operations comprising:

upon handover of the UE from a first base station serving the UE on a first carrier frequency to a second base station serving the UE on a second carrier frequency, determining that (i) the UE is engaged in the voice call, (ii) the second carrier frequency is higher than the first carrier frequency, and (iii) it is currently raining at or between the UE and the second base station;

selecting a transmission mode for use by the second base station to transmit to the UE on the second carrier frequency, wherein, responsive to the determining, the selecting is based on a consideration of what transmission mode the first base station was using for transmitting to the UE; and setting the second base station to use the selected transmission mode for transmitting to the UE on the second carrier frequency, wherein the transmission mode that the first base station was using for transmitting to the UE does not use transmit diversity, and wherein selecting, based on consideration of what transmission mode the first base station was using for transmitting to the UE, the transmission mode for use by the second base station to transmit to the UE on the second carrier frequency comprises: based on the transmission mode that the first base station was using for transmitting to the UE not using transmit diversity, selecting as the transmission mode for use by the second base station to transmit to the UE on the second carrier frequency a transmission mode that uses transmit diversity.

9. The computing system of claim 8, implemented by the second base station.

10. In a wireless communication network comprising a first base station and a second base station, the second base station being configured to control transmission mode for transmission to a user equipment device (UE) upon handover of the UE from the first base station to the second base station, wherein the second base station comprises:

a wireless communication interface through which to engage in air interface communication with and service of the UE;

a backhaul interface through which to engage in handover signaling with the first base station; and a controller comprising a processing unit, non-transitory data storage, and program instructions stored in the data storage and executable by the processing unit to carry out operations, wherein the operations include determining, upon handover of the UE from the first base station to the second base station, (i) that the UE is engaged in a voice call, (ii) that a carrier frequency on which the second base station will serve the UE is significantly higher than a carrier frequency on which the first base station was serving the UE, and (iii) that it is currently raining at or between the UE and the second base station, and wherein the operations include selecting a transmission mode to use for transmission by the second base station to the UE, and wherein the operations include, responsive to the determining, selecting the transmission mode based on consideration of transmission mode that the first base station was using for transmission to the UE, wherein the transmission mode that the first base station was using for transmission by the first base station to the UE does not use transmit diversity, and wherein selecting, based on consideration of the transmission mode that the first base station was using for transmission to the UE, the transmission mode to use for transmission by the second base station to the UE comprises: based on the transmission mode that the first base station was using for transmission to the UE not using transmit diversity, selecting as the transmission mode to use for transmission by the second base station to the UE a transmission mode that uses transmit diversity.

11. The second base station of claim 10, wherein determining that the carrier frequency on which the second base station will serve the UE is significantly higher than the carrier frequency on which the first base station was serving the UE comprises receiving by the second base station from the first base station, in handover signaling for the handover of the UE, an indication of the carrier frequency on which the first base station was serving the UE, and comparing by the second base station the indicated carrier frequency with the carrier frequency on which the second base station will serve the UE.

12. The second base station of claim 10, wherein the carrier frequency on which the first base station was serving the UE is within a range of about 600 MHz to 2.5 GHz, and wherein the carrier frequency on which the second base station will serve the UE is within a range of about 30 GHz to 300 GHz.

13. The second base station of claim 10, wherein determining that it is currently raining at or between the UE and the second base station comprises querying a weather server to determine whether it is raining at or between the UE and the second base station.

14. The second base station of claim 13, further comprising determining a location of the UE, wherein the querying is keyed to the determined location of the UE and a location of the second base station.

15. The second base station of claim 10, wherein selecting the transmission mode based on consideration of transmission mode that the first base station was using for transmission to the UE comprises (i) receiving from the first base station, in handover signaling for the handover of the UE, an indication of the transmission mode that the first base station was using for transmission to the UE, (ii) determining a transmission mode based on consideration of the indicated transmission mode, and (iii) selecting the determined transmission mode.

* * * * *